June 2, 1964  J. P. WESSON  3,135,668
GRAIN PROCESSING EQUIPMENT
Filed Oct. 18, 1961  2 Sheets-Sheet 2
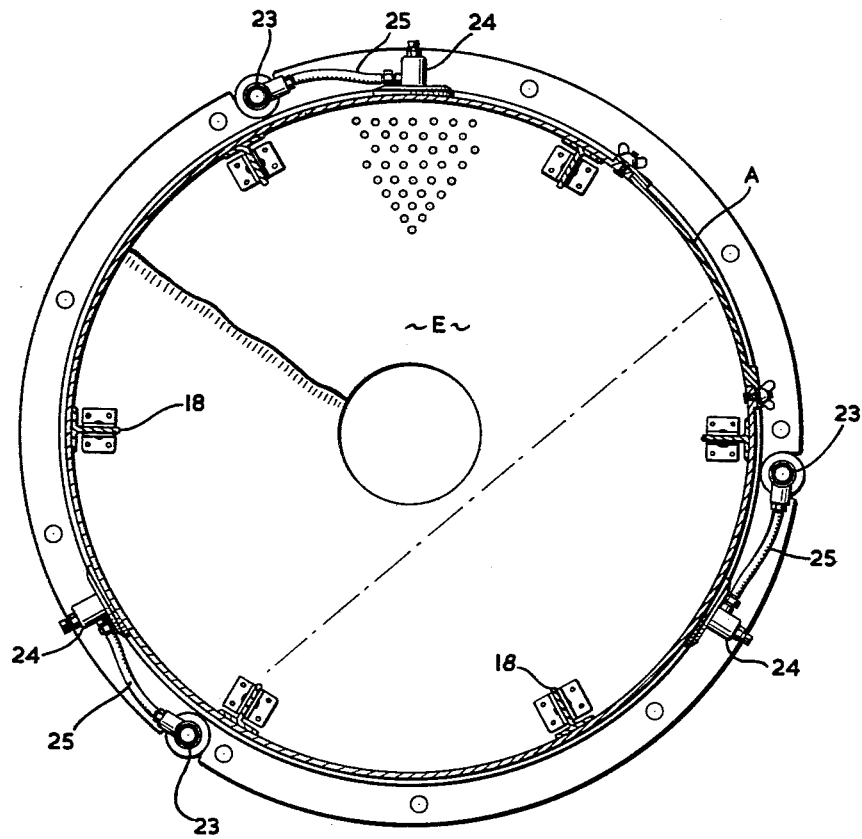
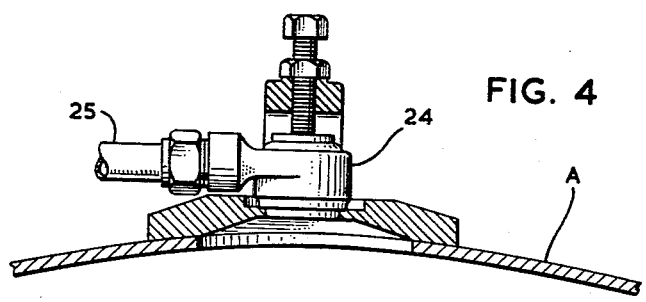
INVENTOR
JOSEPH P. WESSON
BY *Fetherstonhaugh & Co*
ATTORNEYS 3,135,668
GRAIN PROCESSING EQUIPMENT
Joseph P. Wesson, Bury St. Edmunds, England, assignor to Dominion Malting (Ontario) Limited, Toronto, Ontario, Canada, a corporation of Canada
Filed Oct. 18, 1961, Ser. No. 145,859
Claims priority, application Great Britain Oct. 28, 1960
3 Claims. (Cl. 195—131)

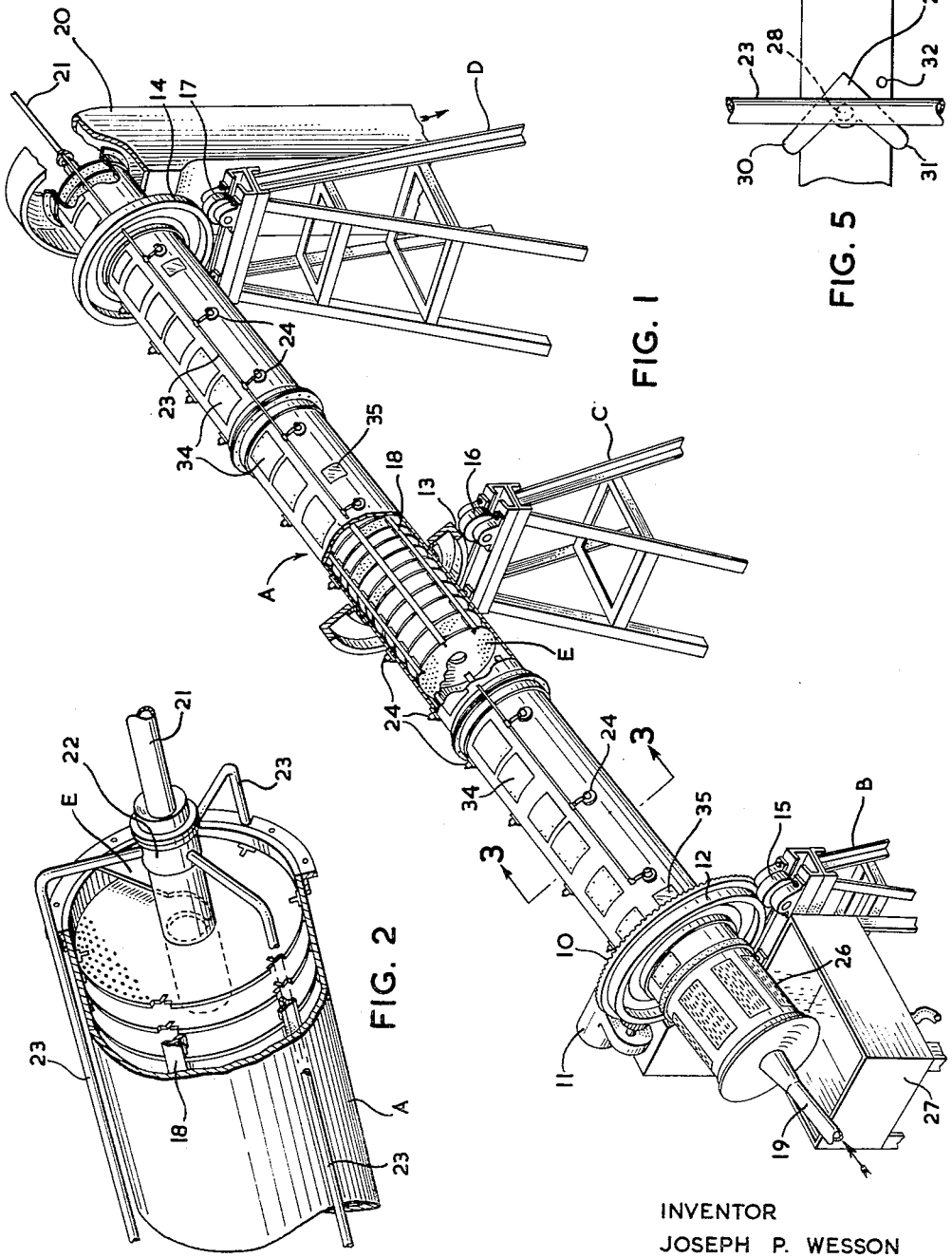

This invention relates to grain processing equipment, for use in malting and which provides for agitation, spray deterging and countercurrent washing of the grain while subjecting it to preliminary spray steeping.

The invention generally comprises apparatus which embodies a vertically inclined elongated tubular drum, a spiral blade conveyor extending therethrough, the blades of which are perforated for passage of water, feeding means for introducing a grain slurry into the lower end of the drum, a grain discharge at the upper end of the drum, water spray means at spaced apart intervals along the length of the drum for deterging, countercurrent washing and preliminarily spray steeping the grain fed therethrough by said conveyor, and drainage means at the lower end of the drum for discharging the wash water therefrom. Preferably, means is associated with the conveyor for agitating the grain by intermittently lifting and cascading the grain as it moves through the drum. Preferably also, the conveyor is secured to the drum and means is provided for rotating the drum and attached conveyor, spraying nozzles being provided at spaced apart intervals along the length of the drum in circumferentially spaced apart series with control means for shutting off the spray of the nozzles when moving with the drum over a lower arc of its rotation.

The invention will be clearly understood by reference to the following detailed specification taken in conjunction with the accompanying drawings, wherein:

FIG. 1 is a perspective, partially sectional illustration of the drum feeding means of the present invention.

FIG. 2 is an enlarged fragmentary partly sectional illustration of the upper discharge end of the feeding drum.

FIG. 3 is a transverse section through the drum taken substantially along the line 3—3 of FIG. 1.

FIG. 4 is an enlarged partly sectional detail illustrating the manner in which the spray nozzles may be applied to discharge into the drum; and FIG. 5 is a schematic detail illustrating the manner in which the spray nozzles are turned off and on at the beginning of and end of their movement with the drum over a lower arc of its travel.

Referring to the drawings, A indicates a grain feeding drum as a whole which is mounted at an incline to the vertical in any suitable way, such as by the supporting frames B, C and D, respectively. In preferred construction, the drum is bodily rotatable as by the ring gear 10 driven from the motor 11, the drum being rotatably supported by the ring tracks 12, 13 and 14 which are in rotary bearing engagement with a plurality of rollers 15, 16 and 17 mounted on the supporting frames B, C and D, respectively. Within the drum A is a perforate spiral bladed conveyor E rigidly secured to the drum in any suitable manner and which may be achieved through the circumferentially spaced apart longitudinally extending ribs 18 which are fastened to the wall of the drum and project radially within to intersect the periphery of, and connect with, the blades of conveyor E. These ribs are designed as agitators and are adapted to lift the grain in the course of its travel through the drum and cause it to drop and cascade. Of course, other means of agitation could be employed.

Grain is introduced to the drum in a slurry by means of the inlet feeding tube 19 and is gradually advanced up through the drum by conveyor E until it is finally discharged at the upper end thereof into a suitable chute or the like 20 which delivers it in deterged presteeped condition to other apparatus for further processing. At the upper discharge end of the drum a central water feed pipe 21 is mounted to feed water into a distributing head 22 to which are connected a plurality of water feed pipes 23 and which are arranged in circumferentially spaced apart relation on the circumference of the feeding drum A. These pipes lead to a plurality of series of spray nozzles 24 disposed in longitudinally spaced apart relation along the length of the drum, each series being circumferentially spaced apart around the circumference of the drum, and which nozzles are fed preferably by flexible tubes 25 connecting between the pipes 23 and the nozzles 24. Consequently, the grain as it travels through the drum via conveyor E will be subjected to agitation, spray deterging, countercurrent washing and spray steeping, the wash water passing through the perforated blades of the drum A and flowing by gravity, down the lower side of the drum, to the feed end thereof which, over an area as indicated by the numeral 26, is foraminous and preferably provided with an open screened section through which the wash water may discharge to a collector 27 and may if desired, be filtered or otherwise cleansed and recirculated.

The spray nozzles are controlled in effect to spray the grain travelling in the conveyor from all sides except for the lower arc of the drum so that sprays are directed downwardly and inwardly from the sides but not upwardly. This is readily controlled by applying a valve 28 (FIG. 5) to each of the pipe lines 23 designed to be located at a point in advance of the track 14 just ahead of the first series of spray nozzles. As schematically illustrated in FIG. 5, the valve stems are preferably provided with the substantially V-shaped actuator 29 having the diverging arms 30 and 31, which actuator projects downwardly from the pipes 23 when they are moving in the lower arc of travel of the drum. Then by mounting on a suitable plate, which may conveniently be carried by the supporting structure D, a pair of upwardly projecting pins or the like 32 and 33 in tranversely and longitudinally spaced apart relation to one another with the pin 32 disposed in the path of arm 31 and pin 33 disposed in the path of arm 30, the water supply to the nozzles in each pipe is shut off over the lower arc of travel of the drum and turned on again as such pipe commences to move towards the upper arc of travel of the drum. It will be obvious that when arm 31 engages pin 32, the valve will be rotated in a clockwise direction as to shut it off and then after an interval controlled by the longitudinal spacing of the pins 32 and 33, the pin 33 will engage arm 30 of actuator 29 as to rotate the valve in an anti-clockwise direction and return it to its normal open position.

While it is preferred to employ a rotating drum of the character above described, it will be obvious of course that similar results may be obtained as well by the employment of a stationary drum with a rotating screw conveyor therewithin. In such case, the ribs 18, or any other means employed for agitating the moving grain, would rotate with the screw conveyor and a similar processing would result.

Preferably the drum should permit of access and inspection and, as shown, is designed to employ a series of doors or closure members 34 along its length which may be opened to provide access to the drum at any reasonable point throughout its length while suitable windows 35 are provided at intervals in its length so that the conditions obtaining in the drum may be subject of observation.

From the foregoing, it will be apparent that the apparatus described will subject the moving and cascading grain to a continuous, very thorough treatment, eliminating deleterious matter therefrom, both by spray deterging and countercurrent washing while simultaneously spray pre-steeping it and which lends to accelerated and efficient processing of the grain in a malting process.

What I claim as my invention is:

1. Grain processing equipment for use in malting thereof comprising a vertically inclined elongated tubular drum, means for rotating said drum, a spiral blade conveyor extending through and rigidly connected to said drum, the blades of said conveyor being perforated for passage of water, feeding means for introducing a grain slurry into the lower end of the drum, a grain discharge at the upper end of the drum, water spray means at spaced apart intervals along the length of the drum for deterging, countercurrent washing and preliminarily spray steeping the grain fed therethrough by said conveyor, and drainage means at the lower end of the drum for discharging the wash water therefrom.

2. Grain processing equipment as claimed in claim 1 including longitudinal ribs on the inner surface of the drum for lifting and agitating said grain whereby to expose all granular particles to the action of spray.

3. Grain processing equipment as claimed in claim 2 in which said agitating means comprises a plurality of circumferentially spaced apart longitudinally extending ribs fastened to the inside wall of said drum and intersecting the periphery of and connecting with the blades of the spiral blade conveyor.

References Cited in the file of this patent

UNITED STATES PATENTS

| | | |
|---|---|---|
| 1,596,236 | Chapman | Aug. 17, 1926 |
| 2,978,229 | Jackson | Apr. 4, 1961 |
| 2,998,351 | Stoddart et al. | Aug. 29, 1961 |